United States Patent [19]

Arai et al.

[11] Patent Number: 5,433,878
[45] Date of Patent: Jul. 18, 1995

[54] METHOD FOR PRODUCING FINE PARTICLES OF BARIUM FERRITE

[75] Inventors: Kunio Arai; Tadafumi Ajiri, both of Sendai; Shin-ichi Yuki, Tokyo; Isao Ota, Funabashi, all of Japan

[73] Assignee: Nissan Chemical Industries Ltd., Tokyo, Japan

[21] Appl. No.: 229,687

[22] Filed: Apr. 19, 1994

[30] Foreign Application Priority Data

Apr. 19, 1993 [JP] Japan .................................. 5-115425

[51] Int. Cl.$^6$ ............................................. C04B 35/26
[52] U.S. Cl. .................................. 252/62.63; 423/594
[58] Field of Search ...................... 252/62.63; 423/594

[56] References Cited
FOREIGN PATENT DOCUMENTS 61-219720  9/1986  Japan .................................. 423/594
   50105  2/1992  Japan .

OTHER PUBLICATIONS

The Abstracts of Presentations at the Meeting of the Society of Chemical Engineering in Yonezawa, pp. 158–159, Jul. 23–24, 1991, "Production of Fine Particles of Metal Oxide in Supercritical Water".

The Abstract of Presentations at the Meeting of The Society of Chemical Engineering in Akita, Aug. 3–4, 1993, pp. 36–37, "Synthesis of Barium Ferrite in Supercritical or Subcritical Water".

The Reports on Project Researches, vol. 2, (published by The Special Society for the Research of Crystallization Technique in Chemical Engineering), Nov. 1993, 11 pages.

*Primary Examiner*—Mark L. Bell
*Assistant Examiner*—C. M. Bonner
*Attorney, Agent, or Firm*—Oblon, Spivak, McClelland, Maier, & Neustadt

[57] ABSTRACT

A method for producing fine particles of barium ferrite, which comprises reacting an aqueous solution comprising an iron compound, a barium compound and an alkaline substance, wherein the molar ratio of hydroxyl groups of the alkaline substance to the total of anions of the iron compound and the barium compound in the aqueous solution is from 1 to 4, and the reaction is carried out at a temperature of at least 250° C. under a pressure of at least 200 kg/cm$^2$ using a flow type reactor.

13 Claims, 4 Drawing Sheets

METHOD FOR PRODUCING FINE PARTICLES OF BARIUM FERRITE

BACKGROUND OF THE INVENTION

1. Field of the Invention

The present invention relates to a method for producing fine particles of barium ferrite useful as a magnetic recording material. More particularly, it relates to a method for producing fine particles of barium ferrite, which comprises reacting an aqueous solution comprising an iron compound, a barium compound and an alkaline substance under a subcritical to supercritical condition for water by means of a flow type reactor.

2. Discussion of Background

In recent years, to meet the requirements for high density magnetic recording, various attempts have been made to develop vertical magnetic recording media by barium ferrite. As a method for producing such barium ferrite, a flux method and a hydrothermal synthetic method are mainly known.

For example, Japanese Unexamined Patent Publication No. 60002/1981 discloses a method wherein an alkali and an alkali carbonate are mixed to an aqueous solution containing an iron (II) salt and a barium salt with stirring to obtain a coprecipitate of ferric hydroxide and barium carbonate, and then the coprecipitate is collected by filtration, washed with water and dried, and then subjected to heat treatment to obtain barium ferrite particles. This method has a merit in that the process is simple and less costly, but it has problems such that it is difficult to obtain the monodisperse particles, and the coprecipitate is poor in the filtration efficiency.

Japanese Unexamined Patent Publication No. 160328/1981 discloses a method wherein an alkaline solution having an iron (II) salt and a barium salt dissolved therein, is treated at a temperature of from 150° to 250° C. in an autoclave to form a precipitate of a barium ferrite precursor, which is then calcined at a temperature of at least 800° C. to obtain barium ferrite powder. By this method, the above-mentioned problem relating to the filtration efficiency of the coprecipitate, can be overcome. However, this method requires a long reaction time, and is a batch method for hydrothermal treatment by means of an autoclave. Therefore, the method has poor productivity and has a problem of high cost in a large scale.

Japanese Unexamined Patent Publication No. 67904/1981 discloses a method wherein components forming barium ferrite, such as barium oxide and iron oxide, and components forming flux such as boron oxide, are mixed and melted, and the melt is rapidly cooled and solidified, and then subjected to heat treatment to precipitate barium ferrite in the flux, and the obtained fine powder is then treated with dilute acid to dissolve and remove the flux components and thereby to extract barium ferrite particles, which are then washed with water and dried. By this method, a fine powder having a sharp particle size distribution can be obtained. However, a high temperature is required to melt the starting materials, and reheating treatment is required. Thus, the process for the production tends to be complicated, and the productivity will be very low.

The present inventor have previously filed a patent application i.e. Japanese Unexamined Patent Publication No. 50105/1992 for a method for continuously producing fine particle of metal oxide by reacting an aqueous solution of a metal salt at a temperature around subcritical or supercritical temperature for water by means of a flow type reactor. As a result of various studies for applying this method to the production of barium ferrite, they have now found a method for selectively producing fine particles of barium ferrite of hexagonal crystal ($BaO \cdot 6Fe_2O_3$) by overcoming the above-mentioned conventional problems by using an aqueous solution comprising an iron compound, a barium compound and an alkaline substance. The present invention has been accomplished on the basis of this discovery.

SUMMARY OF THE INVENTION

Thus, it is an object of the present invention to provide a method for efficiently producing barium ferrite of hexagonal crystal.

The present invention provides a method for producing fine particles of barium ferrite, which comprises reacting an aqueous solution comprising an iron compound, a barium compound and an alkaline substance, wherein the molar ratio of hydroxyl groups of the alkaline substance to the total of anions of the iron compound and the barium compound in the aqueous solution is from 1 to 4, and the reaction is carried out at a temperature of at least 250° C. under a pressure of at least 200 kg/cm$^2$ using a flow type reactor.

DETAILED DESCRIPTION OF THE PREFERRED EMBODIMENTS

Figure 1:
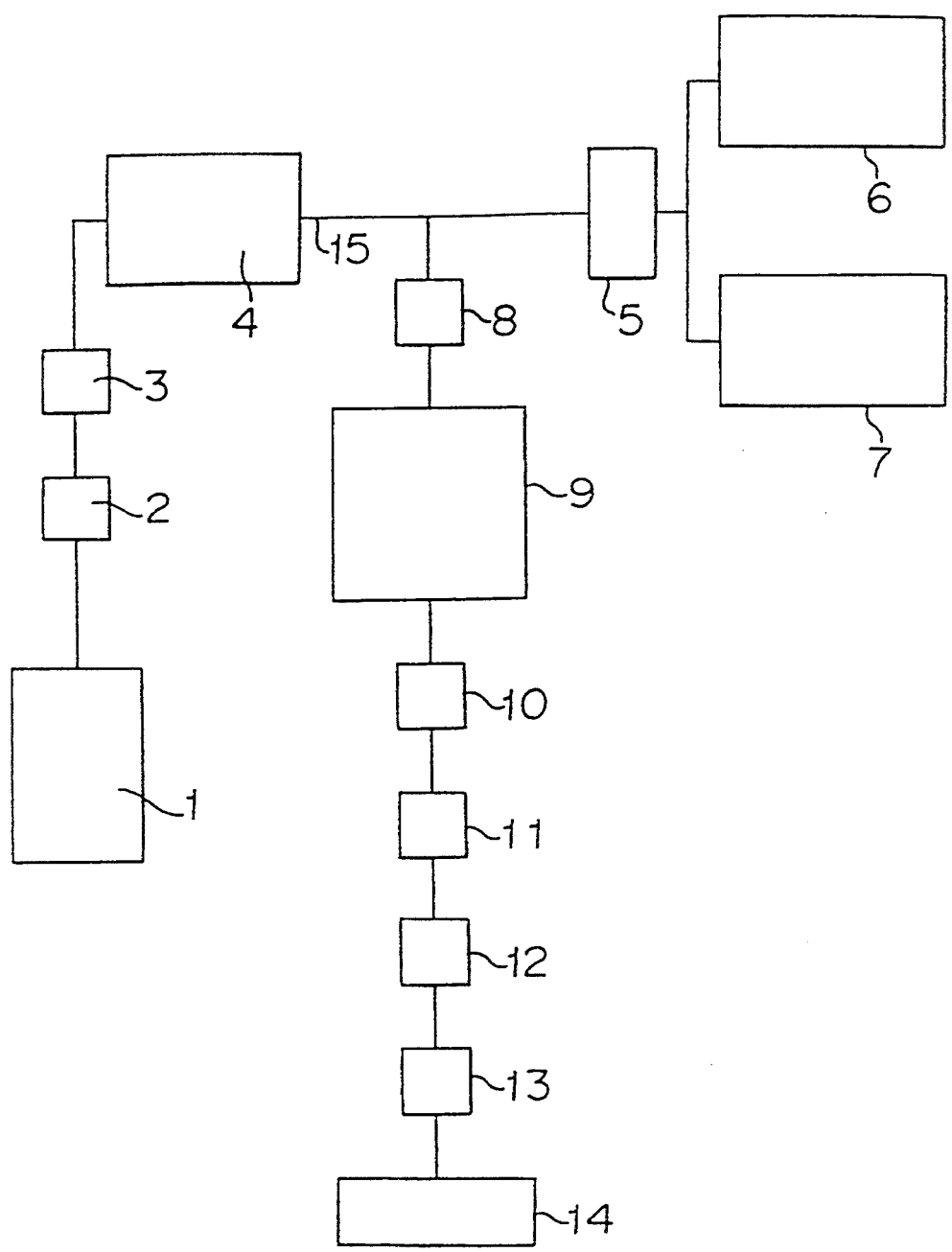
FIG. 1 is a diagrammatical view of an apparatus useful for the method of the present invention wherein a flow type reactor is employed.
Figure 2:
FIG. 2 is an electromicroscopic photograph showing the particle structures of barium ferrite ($BaO \cdot 6Fe_2O_3$) obtained in Example 3. The magnification is 60,000 times.
Figure 3:
FIG. 3 is an electromicroscopic photograph showing the particle structures of barium ferrite ($BaO \cdot 6Fe_2O_3$) obtained in Example 4. The magnification is 60,000 times.
Figure 4:
FIG. 4 is an electromicroscopic photograph showing the particle structures of barium ferrite ($BaO \cdot 6Fe_2O_3$) obtained in Example 8. The magnification is 60,000 times.

Now, the present invention will be described in detail.

The iron compound to be used in the present invention includes, for example, a chloride, a bromide, an iodide, a nitrate, a sulfate, a carbonate, an organic salt and a complex salt. For example, it includes ferrous chloride, ferric chloride, ferrous bromide, ferric bromide, ferrous iodide, ferrous nitrate, ferric nitrate, ferrous sulfate, ferric sulfate and ferrous carbonate. Further, iron salts and iron chelate complexes of e.g. oxalic acid, acetic acid, glycolic acid, glyceric acid, lactic acid, malic acid, tartaric acid, citric acid, mandelic acid and salicylic acid, may be mentioned. These iron compounds may be used alone or in combination as a mixture of two or more of them. Among the above iron compounds, iron nitrate and iron sulfate are preferred, and ferric nitrate is most preferred, from the viewpoint of the solubility in water, the low corrosiveness to the apparatus and the economical aspect.

In the present invention, the concentration of the above iron compound is usually from 0.0001 to 1 mol/l, preferably from 0.001 to 0.05 mol/l, in the aqueous solution of the present invention.

The barium compound to be used in the present invention includes, for example, a halide, a nitrate, a carbonate, and organic salt and a complex salt. For example, it includes barium chloride, barium bromide, barium iodide, barium nitrate and barium carbonate. Further, it may be an organic acid salt such as barium oxalate, or a chelate complex with an organic substance having a hydroxyl group or a carboxyl group in its molecule. These barium compounds may be used alone or in combination as a mixture of two or more of them. Among the above barium compounds, barium nitrate and barium iodide are preferred from the viewpoint of the solubility in water, the low corrosiveness to apparatus and the economical aspect.

In the present invention, the concentration of the above barium compound is usually from 0.0001 to 1 mol/l, preferably from 0.001 to 0.05 mol/l, in the aqueous solution of the present invention.

The alkaline substance to be used in the present invention includes, for example, an alkali metal hydroxide and a quaternary ammonium hydroxide. For example, it includes lithium hydroxide, sodium hydroxide, potassium hydroxide, ammonia and tetramethyl ammonium hydroxide. These alkaline substances may be used alone or in combination as a mixture of two or more of them. Among the above alkaline substance, potassium hydroxide and sodium hydroxide are preferred.

In the present invention, the concentration of the above alkaline substance is usually from 0.0001 to 1 mol/l, preferably from 0.01 to 1.0 mol/l, in the aqueous solution of the present invention.

The aqueous solution to be used in the present invention may be prepared by dissolving powder of an iron compound, powder of a barium compound and an alkaline substance in water. However, it is preferred to prepare an aqueous solution of an iron compound, an aqueous solution of a barium compound and an aqueous solution of an alkaline substance, respectively, which are then mixed. Mixing of such aqueous solutions may be in any order.

With respect to the Fe content of the iron compound and the Ba content of the barium compound in the aqueous solution to be used in the present invention, it is possible to form barium ferrite within such a range that the atomic ratio of Fe/Ba is within a range of from 5/1 to 1/2. However, in order to let fine particles of barium ferrite form selectively and to increase the saturation magnetization and the coercive force of the resulting barium ferrite, the atomic ratio of Fe/Ba is preferably from 2/1 to 1/2.

In the aqueous solution to be used in the present invention, the average particle size of barium ferrite particles increases as the value of Fe/Ba increases. Inversely, the average particles size of the resulting barium ferrite particles decreases as the value of Fe/Ba decreases, whereby the number of resulting particles increases, and the particle size decreases. If the value of Fe/Ba exceeds 5, hematite tends to form, and the average particle size of the resulting barium ferrite is likely to reach about 1 μm, such being undesirable. If the value of Fe/Ba is less than 1/2, a phase change from $BaO.6Fe_2O_3$ to $BaO.2Fe_2O_3 + \alpha\text{-}Fe_2O_3$ will proceed, such being undesirable.

In the aqueous solution to be used in the present invention, the molar ratio (R) of the hydroxyl ions of the alkaline substance to the total of anions of the iron compound and the barium compound is preferably at least 1. By increasing the molar ratio (R), it is possible to form fine particles of barium ferrite and thus to increase the coercive force of the resulting barium ferrite. The molar ratio (R) is preferably from 1 to 4.

If the molar ration (R) of hydroxyl ions of the alkaline substance to the total of anions of the iron compound and the barium compound in the aqueous solution to be used in the present invention, is less than 1, barium ferrite will not form. This is explained as follows. Namely, when mixed with the alkaline substance, iron ions will form a precipitate of iron hydroxide [$Fe(OH)_3$], while barium ions [$Ba^{2+}$] and hydroxyl ions [$OH^-$] will establish a dissolution equilibrium with barium hydroxide ions [$(BaOH)^+$]. Barium ferrite is believed to be formed by bonding and dehydration reaction between iron hydroxide [$Fe(OH)_3$] and barium hydroxide ions [$(BaOH)^+$], and then the addition of the alkaline substance is believed to facilitate the formation of the barium hydroxide ions [$(BaOH)^+$] and thus to increase the formation of barium ferrite.

Further, as this molar ratio (R) increases, the number of the resulting particles increases, and the average particle size of the resulting barium ferrite decreases. The molar ratio (R) may exceed 4, but no further increase in the effects can thereby be expected.

If an aqueous potassium hydroxide solution and an aqueous iron nitrate solution are mixed at a temperature of 250° C. or higher, hematite is likely to form. Therefore, to selectively obtain barium ferrite, the aqueous solution comprising the iron compound, the barium compound and the alkaline substance is preferably heated at a temperature lower than 250° C., preferably from 100° to lower than 250° C., under a pressure of at least 200 kg/cm², prior to introducing it to the reactor After mixing such aqueous solutions, the time necessary to reach to the temperature in the flow type reactor is preferably within a few tens seconds, more preferably within one second, to prevent formation of hematite.

The reactor to be used in the present invention may be a flow type reactor or a batch type reactor. However, from the viewpoint of the production efficiency and for the sake of the rapid heating, a flow type reactor is preferred.

In the present invention, it is preferred to employ a tubular flow-type reactor. In the apparatus shown in FIG. 1, a stainless steel tube is used for the reactor of the present invention, a pump is employed to supply the solution, and the pressure in the system can be controlled by a back-pressure valve. Further, the supply line and the reactor can be heated by sheathed heaters, and the temperature can be controlled by PID. Referring to FIG. 1, an aqueous solution of the alkaline substance sent from a tank 1 through a supply line 15 by a pump 2, is heated by a heater 4 and then mixed with an aqueous solution of the iron compound and an aqueous solution of the barium compound sent from tanks 6 and 7 through a supply line 15 by a pump 5. Then, the solution comprising the iron compound, the barium compound and the alkaline substance, is immediately reacted in a tubular flow type reactor 9. The pressure and the temperature in the mixing and reacting systems are monitored by a pressure gauge 3 and thermometers 8 and 10. The product is cooled to room temperature by a cooler 11 and then collected by a filter 12. The aqueous solution after collecting the product, is returned to atmospheric pressure by a back-pressure valve 13 and introduced into a container 14.

The method for producing fine particles of barium ferrite according to the present invention, which is carried out by means of the apparatus of FIG. 1, is a method wherein the aqueous solution comprising the iron compound, the barium compound and the alkaline substance, is introduced into the reactor and reacted by heating it to the desired reaction temperature. In the method of the present invention, hot water may be supplied to the inlet of the reactor. An introduction of hot water into the inlet of the reactor can effect rapid heating of the above aqueous solution. The above hot water is subcritical or supercritical water.

In this method, the slurry containing barium ferrite particles, obtained by the flow type reactor, is cooled to room temperature by an external water-cooling tube to terminate the reaction, whereupon the barium ferrite can be recovered by filtration by means of a filter.

In the present invention, the reaction of the aqueous solution comprising the iron compound, the barium compound and the alkaline substance is carried out at a temperature of at least 250° C. under a pressure of at least 200 kg/cm$^2$. Particularly preferably, the reaction pressure is from 200 to 400 kg/cm$^2$, and the reaction temperature is from 250° to 400° C. If the reaction temperature is lower than 250° C., the reaction will not be accomplished, such being undesirable. The reaction can be conducted at a temperature exceeding 400° C., but the apparatus for such a reaction will be expensive, and a large scale apparatus will be required.

An increase of the pressure increases the density of the solution and the solubility at the same time. Accordingly, it is effective to reduce the supersaturation degree of the solution and to reduce the number of nuclei to be formed. Further, the dissolution equilibrium between barium ions [Ba$^{2+}$] and hydroxyl ions [OH$^-$], and barium hydroxyl ions [(BaOH)$^+$] tends to move towards formation of the barium hydroxide ions [(BaOH)$^+$] by an increase of the pressure. Therefore, the pressure increase is effective also for increasing the number of nuclei to be formed. The pressure change is influential also over the particle size of the resulting barium ferrite due to its influence over the solubility of the solvent and the reaction for forming barium complex. However, if the reaction pressure is lower than 200 kg/cm$^2$, it is not possible to obtain barium ferrite having good crystallinity in a short period of time. It is possible to carry out the reaction under a pressure exceeding 400 kg/cm$^2$, but the apparatus for such a reaction tends to be large, and a large-scale apparatus will be required.

The residence time of the aqueous solution in the flow type reactor is usually within ten minutes, preferably within three minutes. Within the ten minutes of the residence time, the average particle size increases within the range of a few seconds of the residence time after the initiation of the reaction in the flow type reactor. However, the average particle size tends to gradually decrease when the residence time exceeds 20 seconds. However, if the retention time exceeds ten minutes, BaO.2Fe$_2$O$_3$ will form and grow on the surface of BaO.6Fe$_2$O$_3$ particles, as the residence time increases, whereby the crystallinity of barium ferrite (BaO.6Fe$_2$O$_3$) will be low, such being undesirable.

In general, the hydrothermal synthesis method is a technique wherein the precipitate of a metal hydroxide formed by e.g. hydrolysis is treated at a high temperature under high pressure with water or an aqueous solution to form fine oxide particles. Since the solution at a high temperature under a high pressure is used, the reaction is quick, and the crystallinity and uniformity of the product are excellent as compared with a reaction at a normal temperature under normal pressure. The method of the present invention has, in addition to the above features of the hydrothermal synthesis method, further merits such that (1) as a continuous process, the residence time is very short, and the production efficiency is high, (2) a tubular reactor is used, whereby an external heating system can be employed, and the apparatus can be made compact, (3) the particle size and shape of the resulting particles can be controlled by selecting or adjusting the reaction temperature, the pressure, the metal salt concentration, the residence time and the anion species, and (4) since supercritical water can uniformly be mixed with other gas, the reaction atmosphere can be controlled by introducing a reactive gas together with the aqueous solution of the starting materials to the reactor.

Now, the present invention will be described in further detail with reference to Examples. However, it should be understood that the present invention is by no means restricted by such specific Examples.

EXAMPLE 1

One liter of an aqueous solution containing 0.01 mol/l of ferric nitrate and 1 l of an aqueous solution containing 0.01 mol/l of barium nitrate were supplied by a pump 5 as shown in FIG. 1, and 1 l of an aqueous solution containing 0.20 mol/l of potassium hydroxide was supplied by a pump 2 as shown in FIG. 1 via a heater. The aqueous solutions were mixed. In the mixed aqueous solution, Fe of the ferric nitrate and Ba of the barium nitrate were in such a proportion that the atomic ratio of Fe/Ba was 1, and the molar ratio (R) of OH$^-$ of potassium hydroxide to the total of (NO$_3$)$^-$ of the ferric nitrate and (NO$_3$)$^-$ of the barium nitrate was 4. The temperature of the mixed aqueous solution was 200° C. As the flow type reactor, a flow type reactor of a cylindrical tube made of SUS 316 (outer diameter of the reactor: ⅜ inch, thickness of the wall of the reactor: 1.65 mm) was employed. The supply line and the flow type reactor were heated by sheathed heaters (outer diameter: 1.6 mm), and the temperature was controlled by PID. The mixed aqueous solution was immediately supplied to the flow type reactor and reacted under a reaction pressure of 300 kg/cm$^2$ at a reaction temperature of 380° C. The residence time in the flow type reactor was 1.508 minutes. The effluent from the flow type reactor was cooled to room temperature by a cooling tube. The cooling tube had a double wall structure, and cool water was supplied to the outer tube for cooling. After cooling, the formed particles were collected by an in-line filter (pore diameter: 0.1 μm) disposed in front of the back-pressure valve.

EXAMPLES 2 TO 8

Experiments were conducted in the same manner as in Example 1 except that the conditions were changed as shown in Tables 1 and 2. The results are shown in Table 3.

COMPARATIVE EXAMPLE 1

One liter of an aqueous solution containing 0.01 mol/l of ferric nitrate and 1 l of an aqueous solution containing 0.002 mol/l of barium nitrate were supplied by a pump 5 as shown in FIG. 1, and 1 l of an aqueous solution containing 0.136 mol/l of potassium hydroxide was supplied by a pump 2 as shown in FIG. 1 via a heater.

The aqueous solutions were mixed. In the mixed aqueous solution, Fe of the ferric nitrate and Ba of the barium nitrate were in such a proportion that the atomic ratio of Fe/Ba was 5, and the molar ratio (R) of $OH^-$ of potassium hydroxide to the total of $(NO_3)^-$ of the ferric nitrate and $(NO_3)^-$ of the barium nitrate was 4. The temperature of the mixed aqueous solution was 200° C. As the flow type reactor, a flow type reactor of a cylindrical tube made of SUS 316 (outer diameter of the reactor: ⅜ inch, thickness of the wall of the reactor: 1.65 mm) was used. The supply line and the flow type reactor were heated by sheathed heaters (outer diameter: 1.6 mm), and the temperature was controlled by PID. The mixed aqueous solution was immediately supplied to the flow type reactor. The reaction was conducted under a reaction pressure of 300 kg/cm² at a reaction temperature of 380° C. The residence time in the flow type reactor was 1.508 minutes. The effluent from the flow type reactor was cooled to room temperature by a cooling tube. The cooling tube had a double wall structure, and cool water was supplied to the outer tube for cooling. After cooling, the formed particles were collected by an inline filter (pore diameter: 0.1 μm) disposed in front of the back-pressure valve.

COMPARATIVE EXAMPLES 2 AND 3

Experiments were conducted in the same manner as in Comparative Example 1 except that the conditions were changed as shown in Tables 1 and 2. The results are shown in Table 3.

TABLE 1

| Examples & Comparative Examples | $FE(NO_3)_3$ (mol/l) | $BA(NO_3)_2$ (mol/l) | KOH (mol/l) | Fe/Ba |
|---|---|---|---|---|
| Example 1 | 0.01 | 0.01 | 0.20 | 1 |
| Example 2 | 0.01 | 0.005 | 0.16 | 2 |
| Example 3 | 0.01 | 0.01 | 0.05 | 1 |
| Example 4 | 0.01 | 0.01 | 0.10 | 1 |
| Example 5 | 0.01 | 0.005 | 0.16 | 2 |
| Example 6 | 0.01 | 0.005 | 0.16 | 2 |
| Example 7 | 0.01 | 0.005 | 0.16 | 2 |
| Example 8 | 0.01 | 0.02 | 0.16 | 0.5 |
| Comparative Example 1 | 0.01 | 0.002 | 0.136 | 5 |
| Comparative Example 2 | 0.01 | 0.005 | 0.03 | 2 |
| Comparative Example 3 | 0.01 | 0.00125 | 0.13 | 8 |

TABLE 2

| Examples & Comparative Examples | Molar ratio (R) | Mixing temp. (°C.) | Reaction temp. (°C.) | Reaction pressure (kg/cm²) | Residence time (min) |
|---|---|---|---|---|---|
| Example 1 | 4 | 200 | 380 | 300 | 1.508 |
| Example 2 | 4 | 200 | 380 | 300 | 1.508 |
| Example 3 | 1 | 200 | 380 | 300 | 1.508 |
| Example 4 | 2 | 200 | 380 | 300 | 1.508 |
| Example 5 | 4 | 150 | 380 | 300 | 1.507 |
| Example 6 | 4 | 120 | 380 | 300 | 1.507 |
| Example 7 | 4 | 200 | 380 | 230 | 0.583 |
| Example 8 | 2.3 | 200 | 380 | 300 | 1.507 |
| Comparative Example 1 | 4 | 200 | 380 | 300 | 1.508 |
| Comparative Example 2 | 0.75 | 200 | 380 | 300 | 1.508 |
| Comparative Example 3 | 4 | 260 | 350 | 300 | 2.800 |

With respect to the obtained particles, the particle sizes were measured by an electron microscope. Further, their crystal structures were identified by a powder X-ray diffraction method (XRD). Further, as the magnetic characteristics of the powder, the coercive force and the saturation magnetization were measured. The results of such measurements are shown in Table 3. In the column "Identification by X-ray diffraction" in Table 3, symbol A represents barium ferrite ($BaO.6Fe_2O_3$), and symbol B represents hematite.

TABLE 3

| Examples & Comparative Examples | Identification by X-ray diffraction | Average particle size (μm) | Coercive force Hc(Oe) | Saturation magnetization σs(emu/g) |
|---|---|---|---|---|
| Example 1 | A | 0.322 | 1896 | 36.6 |
| Example 2 | A | 0.365 | 1819 | 38.6 |
| Example 3 | A | 0.811 | 1351 | 39.3 |
| Example 4 | A | 0.377 | 1720 | 39.9 |
| Example 5 | A | 0.533 | 1676 | 46.9 |
| Example 6 | A | 0.454 | 1484 | 47.0 |
| Example 7 | A | 0.188 | 1666 | 39.4 |
| Example 8 | A | 0.218 | 1904 | 39.4 |
| Comparative Example 1 | A + B | 0.635 | 1180 | 23.8 |
| Comparative Example 2 | B + A | 0.370 | 903 | 21.5 |
| Comparative Example 3 | B | — | 105 | 12.0 |

Referring to the results shown in Table 3, it is evident from the comparison between Examples 1, 2 and 8 and Comparative Examples 1 and 3 that as the atomic ratio of Fe/Ba increases, the particle size of the resulting barium ferrite increases, and also that when the atomic ratio of Fe/Ba exceeds 5, hematite is likely to form. Further, by lowering the atomic ratio of Fe/Ba, it is possible to increase the coercive force and the saturation magnetization.

From the comparison between Examples 1, 3, 4 and 8 and Comparative Example 2, it is evident that when the molar ratio (R) of $OH^-/(NO)_3^-$ is less than 1, formation of barium ferrite is difficult, and when this molar ratio(R) is increased, the particle size of the resulting barium ferrite tends to be small, and at the same time, the coercive force increases.

From the comparison between Examples 1 to 8 and Comparative Example 3, it is evident that the temperature for mixing ferric nitrate, barium nitrate and potassium hydroxide prior to introduction into the flow type reactor is preferably lower than 250° C., more preferably from 100° to 200° C., and when the mixing temperature is 260° C., hematite is likely to form.

The present invention is directed to a method for continuously producing fine particles of a compound oxide such as barium ferrite of hexagonal crystal ($BaO.6Fe_2O_3$) by rapidly raising the temperature to a level around the critical temperature of water, followed by heat treatment. According to the method of the present invention, the reaction is a continuous reaction by a flow type apparatus as distinguished from a conventional hydrothermal method which is a batch method employing an autoclave, whereby it is possible to continuously produce fine particles of a compound oxide such as barium ferrite having high crystallinity by a reaction in a short period of time from aqueous solutions with non-stoichiometric atomic ratio (Fe/Ba). Further, the temperature can be raised instantaneously to the reaction temperature, whereby even if a plurality of metal salts differing in the reactivity are employed, the hydrolysis and crystallization occur simultaneously to accomplish uniform composition of the solutes. At present, information systems have been upgraded, and demand for information recording is increasing more than ever. High density and large capacity magnetic recording is desired in an inexpensive magnetic recording method, and the vertical magnetic recording by barium ferrite of hexagonal crystal is the most suitable recording method for high density recording. Magnetic powder of hexagonal barium ferrite ($BaO.6Fe_2O_3$) has a hexagonal plate shape as the particle shape and has an axis of easy magnetization in the vertical direction to the plane of the hexagonal plate. Accordingly, by coating such magnetic powder of hexagonal barium ferrite on a substrate so that the plate Surfaces Of the particles are in parallel with the substrate surface, it is possible to prepare a vertical magnetic recording medium. Further, such a magnetic medium is a coated medium and thus is suitable for mass production, and conventional techniques can be applied to secure reliability such as durability.

What is claimed is:

1. A method for producing fine particles of barium ferrite, $BaO.6Fe_2O_3$, which comprises reacting an aqueous solution comprising an iron compound, a barium compound and an alkaline substance, wherein the molar ratio of hydroxyl groups of the alkaline substance to the total of anions of the iron compound and the barium compound in the aqueous solution is from 1 to 4, and the reaction is carried out at a temperature of at least 250° C. under a pressure of at least 200 kg/cm$^2$ using a flow type reactor, wherein the atomic ratio of Fe/Ba in the aqueous solution is within a range of from 2/1 to 1/2.

2. The method for producing fine particles of barium ferrite according to claim 1, wherein the iron-compound is a chloride, bromide, iodide, nitrate, sulfate, carbonate, organic acid salt or complex salt of iron.

3. The method for producing fine particles of barium ferrite according to claim 1, wherein the iron compound is iron nitrate.

4. The method for producing fine particles of barium ferrite according to claim 1, wherein the barium compound is a halide, nitrate, carbonate, organic acid salt or complex salt of barium.

5. The method for producing fine particles of barium ferrite according to claim 1, wherein the barium compound is barium nitrate.

6. The method for producing fine particles of barium ferrite according to claim 1, wherein the alkaline substance is an alkali metal hydroxide or a quaternary ammonium hydroxide.

7. The method for producing fine particles of barium ferrite according to claim 1, wherein the alkaline substance is potassium hydroxide or sodium hydroxide.

8. The method for producing fine particles of barium ferrite according to claim 1, wherein the aqueous solution comprising an iron compound, a barium compound and an alkaline substance, is mixed at a temperature lower than 250° C., prior to the reaction.

9. The method for producing fine particles of barium ferrite according to claim 8, wherein the iron compound is iron nitrate, and the barium compound is barium nitrate.

10. The method for producing fine particles of barium ferrite according to claim 1, wherein the flow type reactor is a tubular reactor.

11. The method for producing fine particles of barium ferrite according to claim 1, wherein the aqueous solution comprises from 0.0001 to 1 mol/l of the iron compound, from 0.0001 to 1 mol/l of the barium compound and from 0.0001 to 1 mol/l of the alkaline substance.

12. A method for producing fine particles of barium ferrite, $BaO.6Fe_2Q_3$, which comprises mixing an aqueous solution comprising iron nitrate, barium nitrate and an alkaline substance at a temperature lower than 250° C. and then reacting the aqueous solution at a temperature of at least 250° C. under a pressure of at least 200 kg/cm$^2$ in a tubular reactor, wherein the molar ratio of hydroxyl groups of the alkaline substance to the total of anions of the iron nitrate and the barium nitrate in the aqueous solution is from 1 to 4, wherein the atomic ratio of Fe/Ba in the aqueous solution is within a range of from 2/1 to 1/2.

13. The method for producing fine particles of barium ferrite according to claim 12, wherein the aqueous solution comprises from 0.0001 to 1 mol/l of the iron compound, from 0.0001 to 1 mol/l of the barium compound and from 0.0001 to 1 mol/l of the alkaline substance.

* * * * *